(12) United States Patent
Pottinger et al.

(10) Patent No.: US 8,109,818 B2
(45) Date of Patent: Feb. 7, 2012

(54) HOME CITY FOR A REAL-TIME STRATEGY VIDEO GAME

(75) Inventors: David Pottinger, Redmond, WA (US); Greg Street, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1147 days.

(21) Appl. No.: 11/367,311

(22) Filed: Mar. 6, 2006

(65) Prior Publication Data

US 2007/0207844 A1      Sep. 6, 2007

(51) Int. Cl.
*A63F 13/00* (2006.01)
(52) U.S. Cl. ................................. 463/9; 463/1
(58) Field of Classification Search ................. 463/9, 1, 463/7
See application file for complete search history.

(56) References Cited

U.S. PATENT DOCUMENTS 6,267,677 B1 * 7/2001 Tajiri et al. ...................... 463/43
6,807,521 B1 * 10/2004 Kurosawa et al. ............. 703/22
2003/0008696 A1 * 1/2003 Abecassis et al. ................ 463/9
2003/0186741 A1 * 10/2003 Hayashida et al. ............. 463/31
2003/0224856 A1 * 12/2003 Bukovsky et al. ............. 463/42

OTHER PUBLICATIONS

Kasavin, Greg. "Age of Empires III Review", Published Oct. 14, 2005 (http://www.gamespot.com/pc/strategy/ageofempiresiii/review.html).*

* cited by examiner

*Primary Examiner* — Peter DungBa Vo
*Assistant Examiner* — Allen Chan
(74) *Attorney, Agent, or Firm* — Lee & Hayes, PLLC

(57) ABSTRACT

A strategy video game may include a persistent home city that gains experience as the player plays in more game sessions. The experience gained may lead to the unlocking of additional game features and options for use in future games. Players may assemble, prior to a game session, a subset of effects that may be used in future games, where the subset may be limited in number. Available effects may be limited by the experience level of the player's home city, and by the player's prior decisions as to which effects to purchase and/or obtain. Effects may be requested in-game, and may be delivered and/or carried out in response to the player achieving certain in-game requirements, such as the gaining of a number of in-game experience points, the passage of a predetermined amount of time, etc.

20 Claims, 7 Drawing Sheets

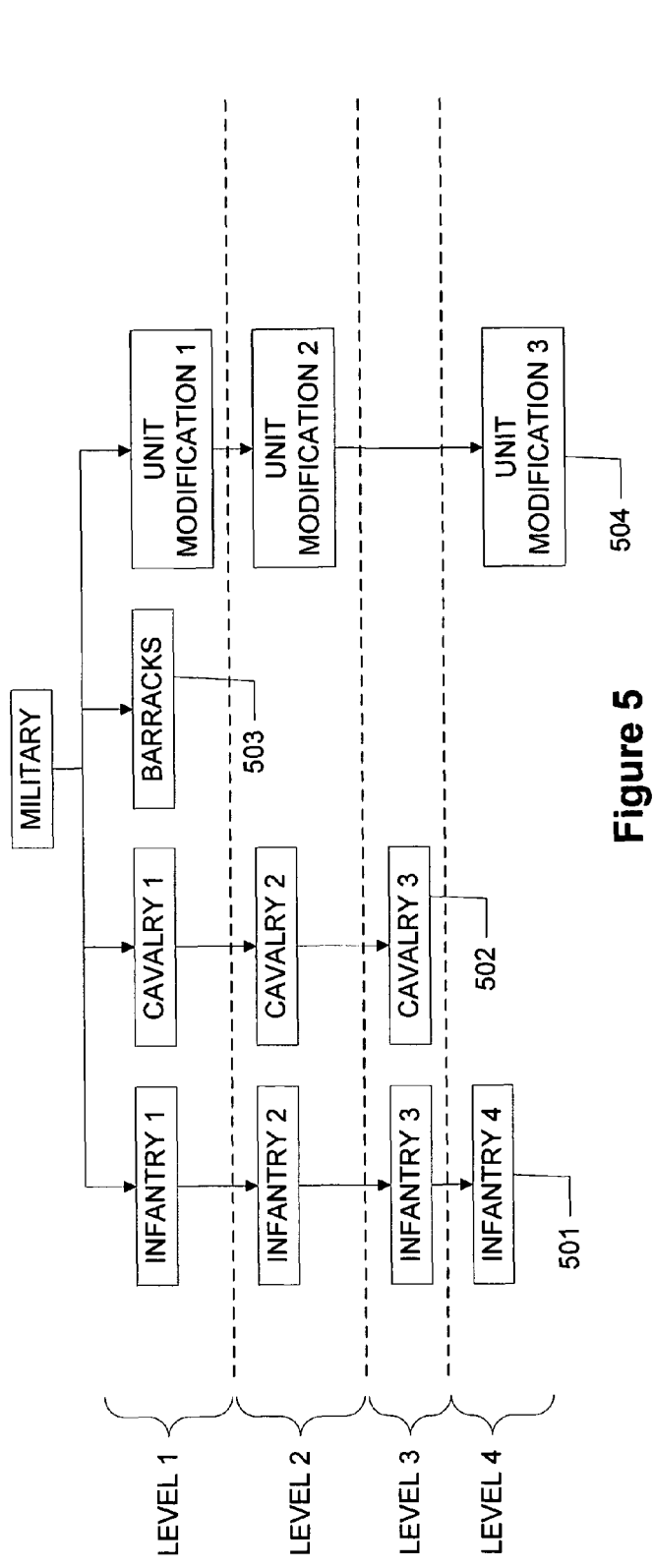

HOME CITY FOR A REAL-TIME STRATEGY VIDEO GAME

BACKGROUND

As the popularity of video games grows, and more games are offered in the marketplace, video game developers continue to push for innovative game play. In the strategy video game realm, one growing type of game is the real-time strategy (RTS) game. In an RTS game, players may initially be given control over a small number of characters or units on a map, and may direct the characters to eventually grow a civilization with many characters and, often, to obliterate other players' characters. Commands may be given to the characters to move to certain places, collect certain resources on the map, build structures (e.g., houses, farms, etc.), or battle characters belonging to competing players, and the player may watch as the characters carry out those commands in real time. For example, each action may require a certain amount of time to perform (e.g., 5 seconds, 10 seconds, etc.), and the onscreen characters may be animated to show them performing the command (e.g., walking around the map, chopping wood, etc.).

The strategy comes in deciding what commands to give to the characters, and when. Some players may choose to quickly build an army of inexpensive military units, while other players may choose to spend more time improving their technological resources, so that their eventual military units may be more effective in battle.

The RTS game typically ends when one player's characters are successful in destroying the other players' characters and/or the various structures that those other players built (e.g., their own houses, villages, etc.). At the conclusion of the game, the game may provide the player with a statistical rundown of how the player fared, and the player may then choose to start a new game from the beginning.

As noted above, video game developers continue to develop new features for their games, and it would be an advance in the art if further new and innovative features could be developed for the RTS genre.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A strategy video game can be carried out in which a player's home city is awarded experience points at the conclusion of a game based on the player's achievements during the game session. That home city, and its new experience level, may persist in future games, and the player's home city may accumulate experience points over time as the player plays more game sessions. The home city may be represented as a location, but may also be located off of a map on which a game session takes place.

When the home city gains enough experience points to pass a threshold, the city may gain a level, and the player may be given the option of selecting a new effect to add to a collection of effects owned by the player. The effects, which can be single- or multiple-use, may be in-game resources, such as minerals, foods, units, buildings, technologies, etc. Effects may also change victory conditions, or affect opponents' collections of available effects, sometimes referred to as decks. Prior to a game session, the player may be prompted to assemble a deck of his/her effects, employing the player's strategy for the upcoming game. In some games, the various effects that are available to the user may be restricted based on the experience level of the player's home city.

One or more computer-controlled players may also have home cities that advance alongside a human player's city. The computer-controlled players may then be ready to provide a worthy challenge to human players.

During the course of a game session, requested effects may be withheld until the player meets a predetermined criterion, such as the passage of an amount of time, or the acquisition of a predetermined number of in-game experience points.

In some games, an in-game reset or refreshing of player decks may occur. This may involve, for example, replacing a player's original deck with a second deck for use in later stages of the game, or restoring the player's original deck so that expired or used effects are returned and available for another use.

A home city screen may be displayed to depict the player's city and its experience level. The appearance may be changed as the city gains levels, and may be available online for other players to see. Players may trade effects, and wager them on the outcome of game sessions.

These and other features will be described in greater detail below.

BRIEF DESCRIPTION OF THE DRAWINGS

FIG. 4 illustrates an example data structure containing data for multiple home cities.

FIG. 5 illustrates an example hierarchy of effects that may be selected by a player.

DETAILED DESCRIPTION

Figure 1:
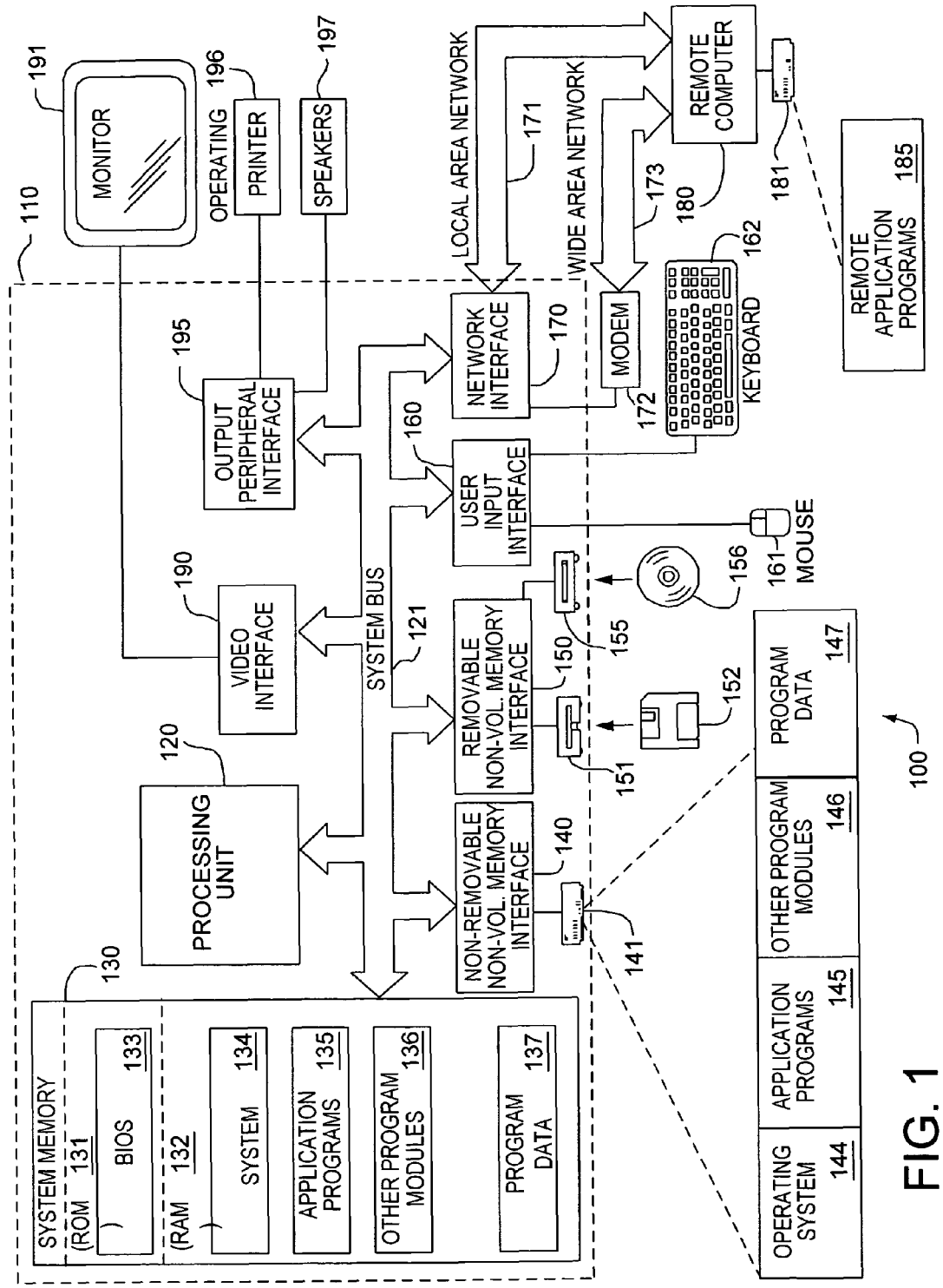
FIG. 1 illustrates an example of a computing system environment.

FIG. 1 illustrates an example of a suitable computing system environment 100 on which the features herein may be implemented. The computing system environment 100 is only one example of a suitable computing environment and is not intended to suggest any limitation as to the scope of use or functionality of the features described herein. Neither should the computing environment 100 be interpreted as having any dependency or requirement relating to any one or combination of components illustrated in the exemplary operating environment 100.

The features herein are described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the features may be practiced with other computer system configurations, including hand-held devices, multiprocessor systems, microprocessor-based or programmable consumer electronics, minicomputers, mainframe computers, and the like. The features may also be practiced in distributed computing environments where tasks are performed by remote processing devices that are linked through a communications network. In a distributed computing environment, program modules may be located in both local and remote computer storage media including memory storage devices.

With reference to FIG. 1, the exemplary system 100 for implementing features described herein includes a general purpose-computing device in the form of a computer 110 including a processing unit 120, a system memory 130, and a system bus 121 that couples various system components including the system memory to the processing unit 120.

Computer 110 may include a variety of computer readable media. By way of example, and not limitation, computer readable media may comprise computer storage media and communication media. The system memory 130 may include computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, may be stored in ROM 131. RAM 132 may contain data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface such as interface 140, and magnetic disk drive 151 and optical disk drive 155 may be connected to the system bus 121 by a removable memory interface, such as interface 150.

The drives and their associated computer storage media discussed above and illustrated in FIG. 1 may provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. Many of the features described herein may be implemented using computer-executable instructions stored on one or more computer-readable media, such as the media described above, for execution on the one or more units that make up processing unit 120.

Figure 2:
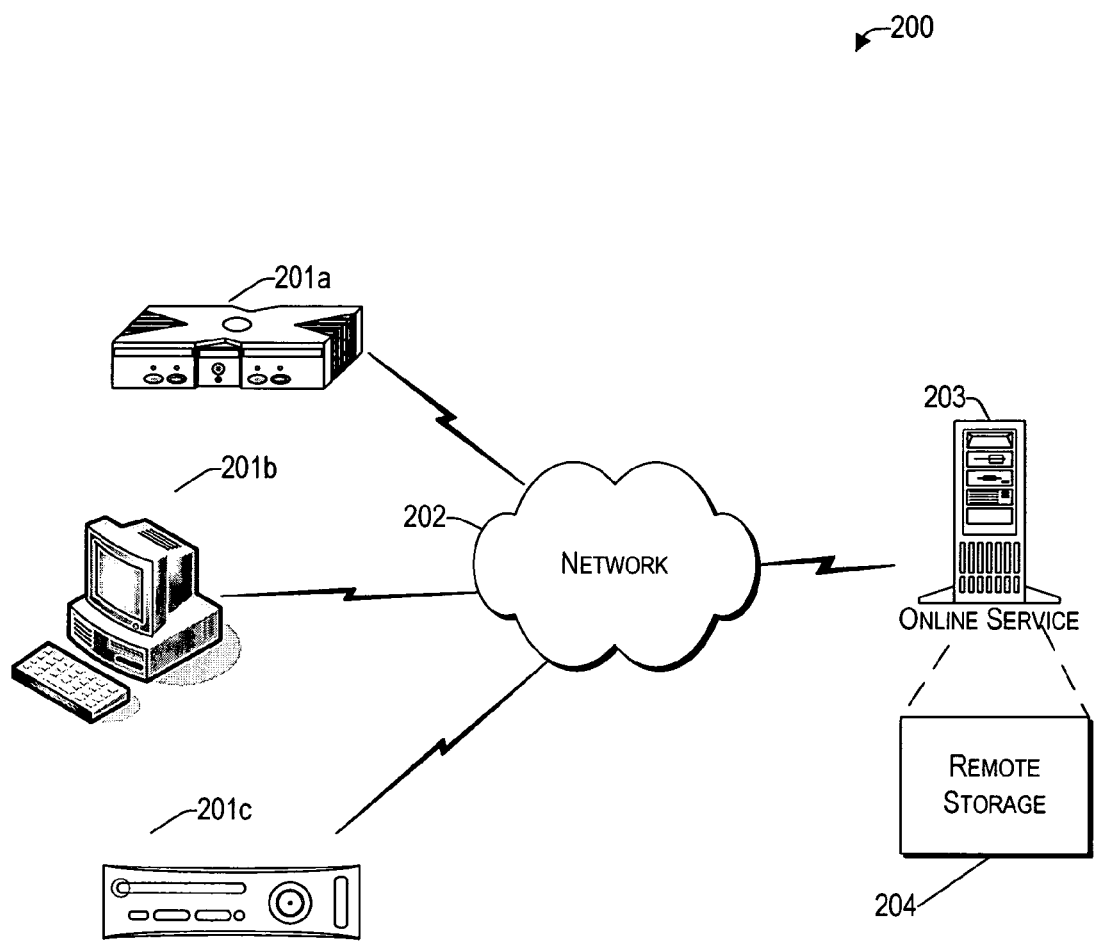
FIG. 2 illustrates an example networked configuration.

FIG. 2 shows an example network gaming environment 200 that interconnects multiple gaming systems 201a-c via a network 202. The various gaming systems 201 may be computing devices as shown in FIG. 1, and may be dedicated gaming consoles 201a,c, personal computers 201b, or a combination thereof. The network 202 represents any of a wide variety of data communications networks. It may include public portions (e.g., the Internet) as well as private portions (e.g., a residential Local Area Network (LAN)), as well as combinations of public and private portions. Network 202 may be implemented using any one or more of a wide variety of conventional communications media including both wired and wireless media. Any of a wide variety of communications protocols can be used to communicate data via network 202, including both public and proprietary protocols. Examples of such protocols include TCP/IP, EPX/SPX, NetBEUI, etc.

In addition to gaming systems 201a-c, one or more online services 203 may be accessible via the network 202 to provide various services for the participants, such as hosting online games, serving downloadable music or video files, hosting gaming competitions, serving streaming audio/video files, and the like. The network gaming environment 200 may introduce another memory source available to individual gaming systems 201a-c—online storage. In addition to the storage media shown, for example, in FIG. 1, the gaming systems 201a-c can also access data files available at remote storage locations via the network 202, as exemplified by remote storage 204 at online service 203.

Figure 3A:
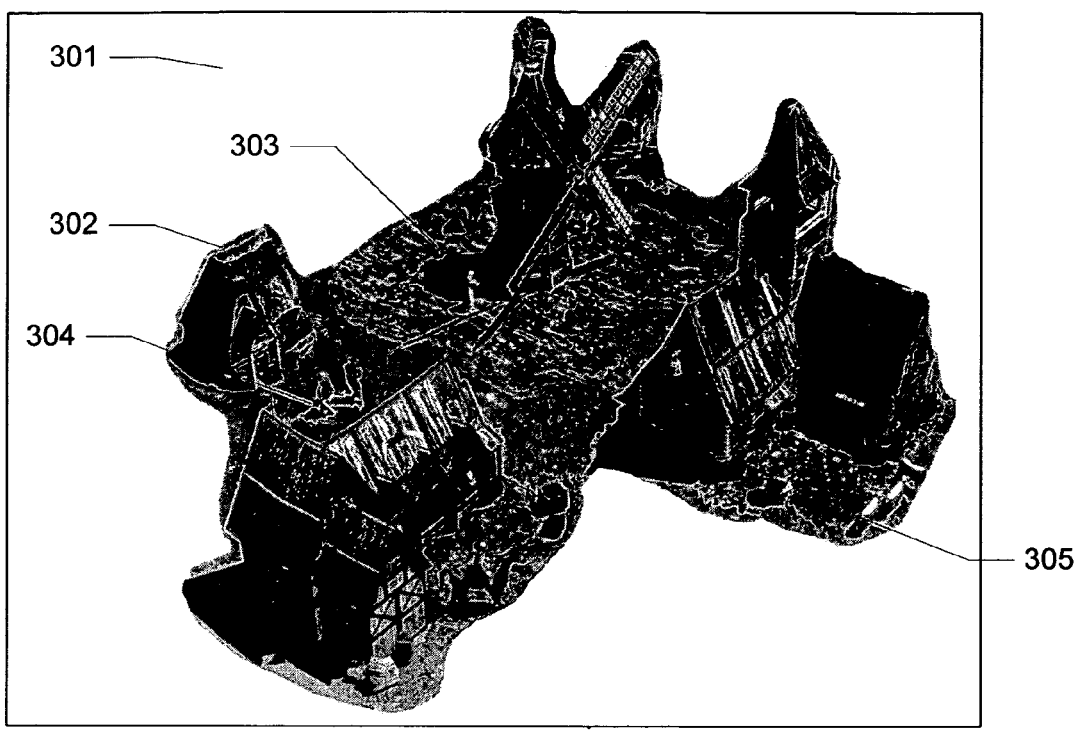
FIGS. 3a-b illustrate example map views that may be provided in an RTS game.

FIG. 3a illustrates an example map 301 that may be displayed on the display device of a gaming system playing a strategy game, such as a real-time strategy game in which player commands are carried out by onscreen characters in a predetermined amount of time. The game may display various elements that belong to the player, such as various buildings 302. Different buildings may serve different purposes in the game. For example, some buildings may be houses, where each house may support a predetermined number of character units that the player may have in his/her civilization. Another building may be a source of those character units, such as a village or town center. Other buildings may serve as sources for different units, such as a barracks for military units (e.g., soldiers), a church for religious units, etc. Constructing units and buildings may require resources in the game, such as food, wood, metal, etc., and there may be other buildings that are used for that purpose (e.g., a farm that supplies food, a livery that supports livestock, a granary that stores food, etc.). Other buildings may serve to improve capabilities of the player's units, such as an armory to improve weapons, a library to research technologies, etc.

Figure 3B:
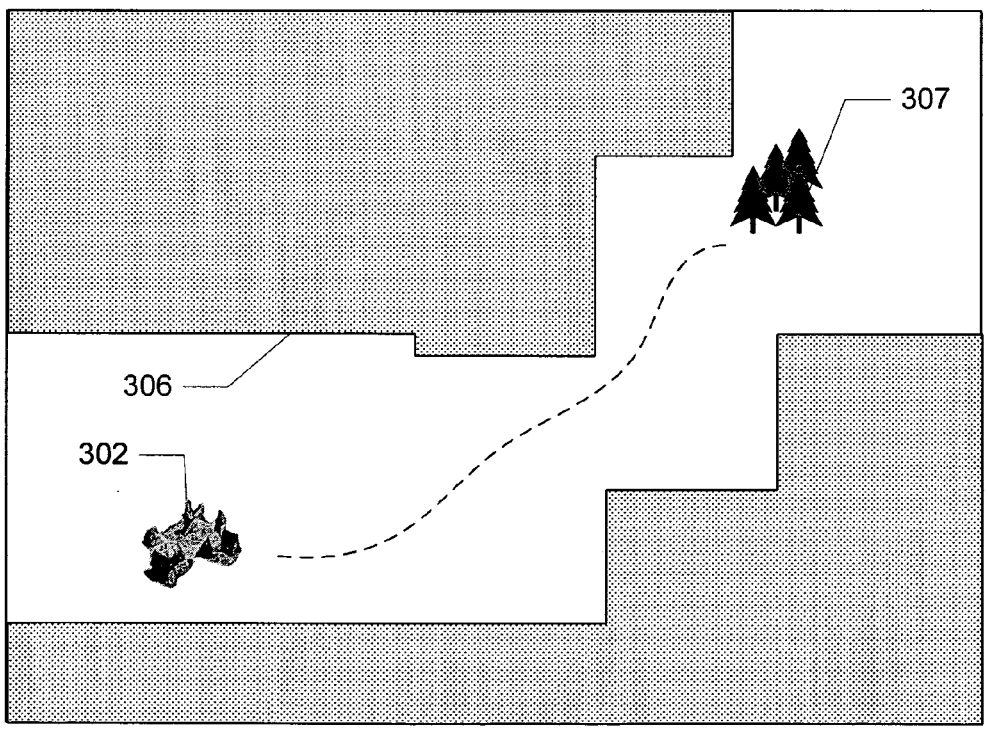

The map may be a large scale, and the portion shown in FIG. 3a may simply be a small part. FIG. 3b illustrates an example of a larger area map, with the view from FIG. 3a shown as its buildings 302. The actual map may have a "fog of war" 306 obscuring visual details of portions of the map that have not been visited by the player's characters, or are not currently within a visual range of the player's characters. During gameplay, the player may direct his/her players to different locations on the map to explore these areas, or to interact with map features, such as collecting wood from a forest 307. This may be done, for example, by clicking a mouse button with a pointer on the desired character, and clicking again with the pointer on the desired location.

As an additional layer of complexity and strategy, each player may be provided with a virtual home city. The home city may be an off-map location that supports the player and provides occasional resource and assistance to the player. For example, in a game set in colonial times in North America, one player may play as British settlers, and may have London as a home city providing support to the player. Other players may play as settlers from other nations, with different home cities supporting them. The support may be in the form of in-game resources, such as building materials, personnel, buildings, etc, or any of a variety of other types, such as improvements to player units (e.g., making villagers move faster, soldiers fight better, etc.), technological improvements (e.g., allowing the player to research higher levels of technology or build more sophisticated units), altering victory conditions of the game, affecting an opponent's deck of effects, etc. The player may be required to select a subset of the available support effects prior to the start of the game, and the decisions of what support effects to include may lead to various strategic decisions, as will be discussed below.

FIG. 4 illustrates an example of a data structure that may be stored in any of the memory devices available to the system. The structure may store data 401 for a variety of human players, as well as data 402 for one or more computer-controlled (e.g., artificial intelligence—AI) players. For each player, the structure may identify the player's name 403, and a text field 404 identifying a name that a player (if human) has typed. The game may provide a predetermined number of home city types, such as one for each of the various nationalities that the player may assume in the game, and the structure may include an identifier of that type. The player's type or nationality may be used by the game program to determine the types of units available, the type of images to display (e.g., English architecture for British players), etc.

Each player's home city may gain experience points through prior game sessions. For example, the game may assign different levels of experience points to certain actions, such as eliminating an opponent's infantry unit, eliminating an opponent's building, locating hidden resources on the map, building certain structures, surviving a predetermined amount of time, etc., and as the player accomplishes these actions in game sessions, experience points are added to the home city's overall experience. This experience may be represented as numerical points 406, and the home city (and its experience) may persist from game to game, growing with each game.

The game may also define a number of predetermined experience point thresholds, or experience levels, and when a player's home city accumulates enough points to pass one of these thresholds, the city may "level up," or gain a level. Gaining a level may allow the player to access higher level support effects for future games, "unlocking" them. To support this, the data structure may include data values 407 identifying the various effects that are available to the home city, or "unlocked." In the example depicted, the value may simply be a series of bit flags, arranged according to a predetermined list of available effects, indicating whether each effect is available to the given player. Additionally, the game may further require the player to "purchase" effects that have been unlocked, and in such games the availability data 407 may also identify the number of copies of each effect that the player has purchased.

As noted above, the game may require players to select a subset of effects prior to a game session. For example, the player may be required to select a subset of his/her purchased or obtained effects to use in the coming game (e.g., limited to a predetermined number of effects, such as 20). The player may construct the collection, or deck, of effects in advance by selecting the various effects to include. Some effects may have a limitation on the number of times they can be used (e.g., once), and if a player is particularly fond of a given effect, the player may choose to include multiple copies of that effect in his/her deck (assuming the player has purchased or obtained multiple copies), so that the effect can be used more frequently during the game. The structure may include data 408 identifying the decks of effects that the player has assembled and their contents (e.g., a textual name and a listing of effects included). The player can construct multiple different decks for different gameplay strategies (e.g., a deck with a military emphasis, an economic emphasis, etc.), and the structure may store data identifying the various decks.

The various effects in the game may be arranged in a hierarchical tree, accessible depending on the player's home city level. For example, FIG. 5 illustrates an example tree for military-type effects, having different effects for infantry units 501, cavalry units 502, buildings 503, unit modifications 504 (e.g., making units more effective in battle, faster movement, better defense, cheaper to make, etc.), etc. The player may begin with a home city at level 1, with access to the first level of cards in these areas. Upon gaining a level, to level 2, the player may unlock the next level of effects (e.g., Infantry 2, Cavalry 2, and Unit Modification 2), making those effects accessible for purchase. The player may then select another card for purchase (either from the newly-unlocked cards, or from the previously-unlocked ones) to add to his/her collection of effects. The cost of the purchase may be in experience points, actual money, or the player may simply be given the option of obtaining another effect with every level gained (or at predetermined threshold intervals between levels—e.g., gaining another effect for every $1/10^{th}$ of a level gained). As the player's home city gains levels, the player may have to make strategic choices as to what new effect to add to his/her collection. Although the FIG. 5 example is of military units, other trees may exist for other types of effects, such as economic effects, scientific effects, etc.

Figure 6A:
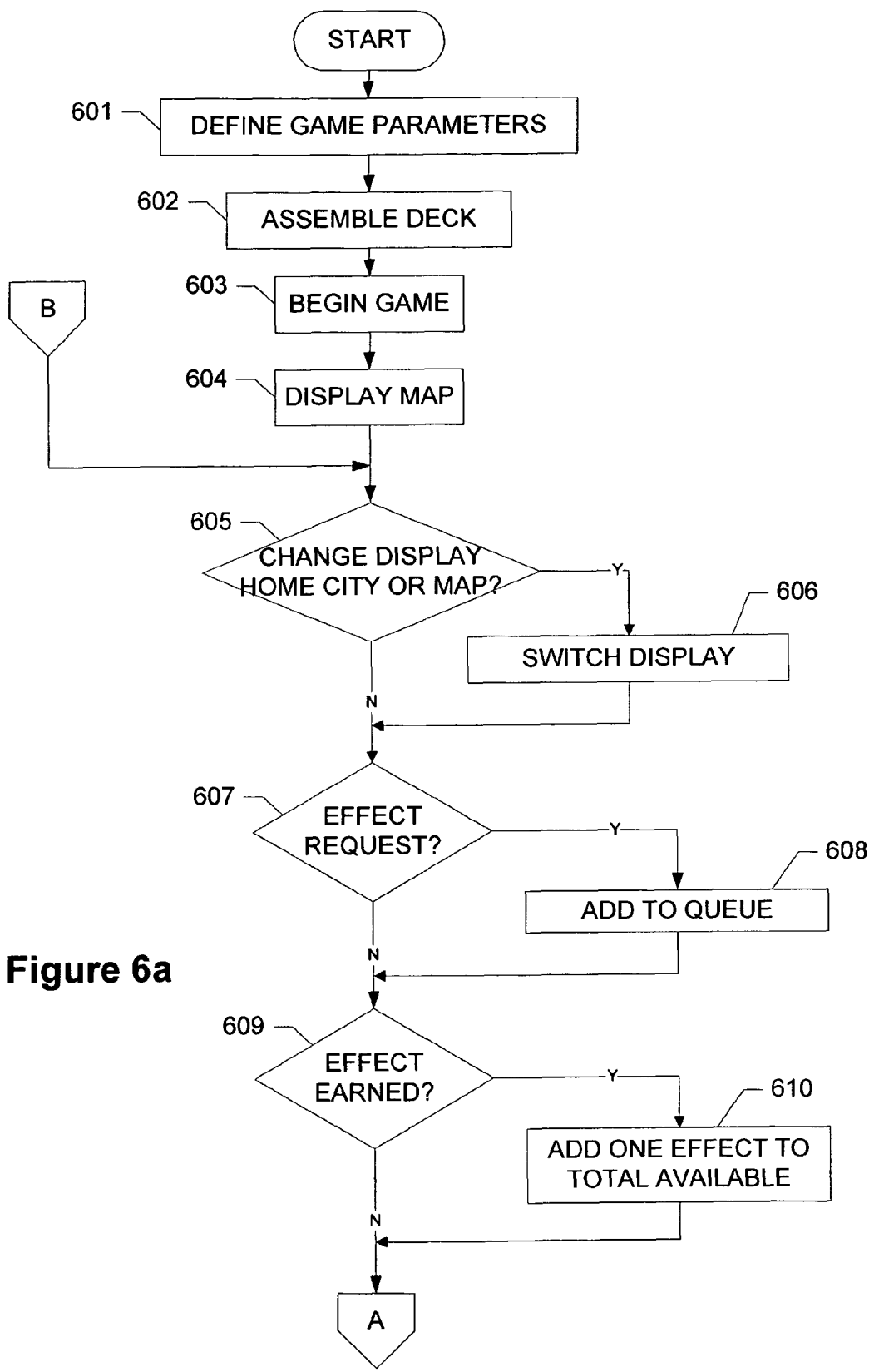
FIGS. 6a-b illustrate an example method of managing a home city in an RTS game.
Figure 6B:
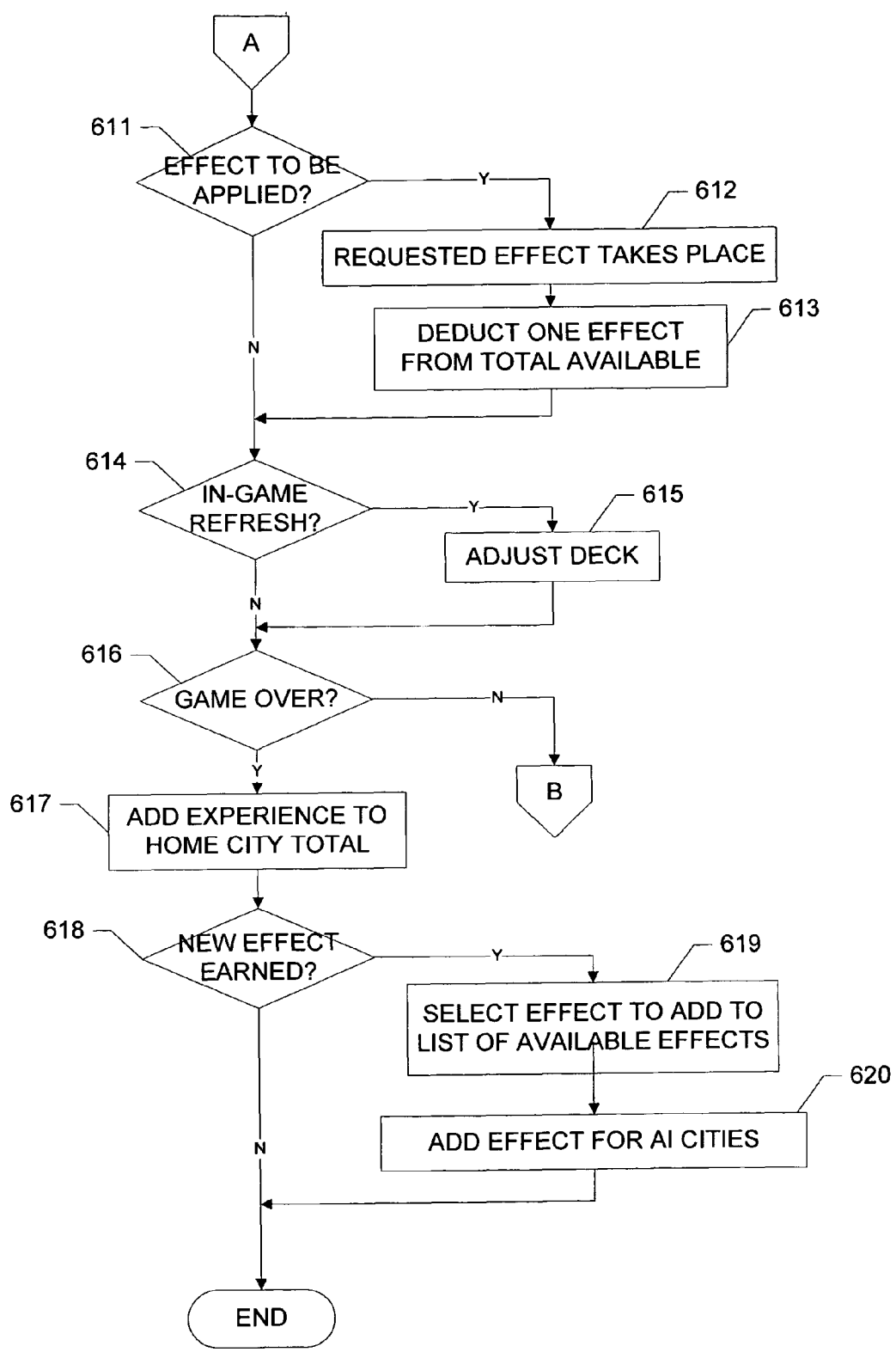

FIGS. 6a-b illustrate an example method of implementing a home city in a strategy game. The method steps may be performed by a computing device carrying out instructions in a computer program, and may begin in step 601 with the definition of the parameters for the upcoming game. The parameters may include, for example, identifying a size and/or type of map on which the game will be played, the number, type (human/computer), and/or level of the opposing players, etc.

In step 602, the player may then assemble a deck for use in the game by selecting from the various effects that the player has purchased. The player's selections may involve the player's desired strategy and plan for the game. Although this step is described in the example as occurring after a game is defined, the decks may be assembled by the player in advance. This step may occur for all players participating in the game, including computer-controlled players (which may automatically select a preconfigured or random deck). In step 603, with the decks selected for the various players, the game may begin. For an RTS game, the players may start with an initial state of units, such as a single town center and a small number of villagers, and may begin directing their units to explore, build, gather resources, etc.

The game play may unfold from a map view, in which the players view the maps at a desired zoom level (e.g., between FIGS. 3a and 3b), and the map displayed at step 604. In step 605, a check may be made to determine whether the user has requested to switch views to view the player's home city. As noted above, each player's home city is not located on the game play map, so a separate view may be helpful to view the home city. Home city commands, explained further below, may be issued and/or viewed from the home city view, although such commands may be entered from the main map view as well.

If the player has requested to switch views, either from the map view to the home city view or vice versa, the process may move to step 606 and switch to the desired view. If not, the process may move to step 607, and check to see whether the user has requested to use one of the effects from his/her deck. The player's request may come, for example, from a selection (e.g., by mouse click) of an onscreen indicia representing an available effect from the player's deck. If the player has requested to use an effect, the process may proceed to step 608 and add the request to a queue of pending requests for the player. The queue may be a data structure stored in the RAM of a computing device running the game.

In the game, the user's ability to actually use one of the effects from his/her deck may be limited, such that he/she cannot use the entire deck immediately from the start. For example, some effects may require that the user has accomplished certain in-game requirements, such as gaining a predetermined number of experience points, researching a predetermined number of technologies, building a predetermined building structure, having a predetermined type of unit, etc. Effects may also be restricted to a periodic appearance, such that the user is able to use one effect after the passage of a predetermined period of time (e.g., each minute that passes allows the user to use one effect from the queue). In step 609, the game program may check to see whether the conditions for earning an effect have been met. If they have, the process may then move to step 610, at which time the game program may note that the user has earned one additional effect. The program may maintain a data value identifying the number of earned effects, and may increment this by one in step 610 to reflect the earned effect.

Then, in step 611, the program may check to see whether an effect is to be applied in the current game. The criteria for applying an effect may be simply that the player's queue has at least one selected effect, and that the total of earned effects indicates that the player has at least one remaining earned effect. Other in-game conditions may also be applied at this stage, such as in step 609. If the effect is to be applied, then the effect may be applied in step 612. Many types of effects may be used in the game. Some effects may cause a predetermined resource (e.g., wood, food, mineral, building structure etc.) to be delivered from the home city to a location on the player's map. That location may be a predetermined location, such as a default town center, or it may be a player-designated position. In some games, the delivered resource may appear at a predetermined location, such as the edge of a map, and the player may be responsible for retrieving it from that location and bringing it to the player's town center.

Other effects may deliver character units, such as a predetermined number of infantry, villagers, etc., which may also appear at a predetermined location, the edge of a map, or another location identified by the player. Other effects may grant the player an advance, advantage or capability that would otherwise take more time if earned in-game, such as the development of an improvement to an existing unit. Other effects may alter one or more victory conditions of the game. For example, if the game began with a victory condition identifying a number of neutral points on the map that must be controlled to win, the victory condition effect may adjust the number and/or location of such points. Effects could also interfere with an opponent's own deck, such as delaying the opponent's earning of a new effect, rendering one or more of that player's effects unusable, etc. Other effects may alter one or more characteristics of the units on the map. For example, one type of effect may be a damage effect (e.g., an artillery bombardment, air strike, magical meteor strike, etc.) that causes damage to one or more units at a location (which may be user-defined) on the map. As another example, one type of effect may be a benefit effect, in which one or more units are benefited or improved, such as healed, made to move faster, made to have a higher defense rating, etc.

Additionally, effects may be variable and have a different impact on the game depending on different game situations. For example, an effect that grants a player additional units, such as infantry, may grant different numbers of infantry units depending on the status of the game at the time the effect is used—e.g., the infantry effect may grow during the game while it is unused. For example, if the player waits more than 5 minutes to use the effect, the effect may generate twice as many units as it would if it were used earlier. As another example, an effect may grant an additional percentage of a unit type (e.g., increasing a player's infantry army by 10%). Alternatively, use of one effect may automatically cause the remaining unused effects to increase or decrease their effectiveness.

The actual implementation of the effect may itself take a predetermined amount of time, and when the effect is implemented, the player's tally of total available effects is reduced by one in step 613. The used effect may also be removed from the player's deck, or otherwise identified as consumed and unavailable for future use. If desired, some effects may be persistent, and may be of unlimited use.

In some games, the program may include an in-game reset or refresh to the players' decks based on one or more predetermined criteria. Such a reset or refresh may restore used effects to players' decks, and may be helpful, for example, in longer games at a time when the players are likely to have exhausted their decks. The in-game refresh may occur at a predetermined time in the game (e.g., after 20 minutes), or after one or more predetermined criteria are met (e.g., all players meet, or upon the first player meeting, a particular experience level in the game, or attain a certain technology or technological age). In step 614, a check may be made to determine whether an in-game refresh is to occur to the player's deck of effects. If a refresh is to occur, the players' decks may be restored in step 615 to their original state at the start of the game. Alternatively, players may select or assemble multiple decks in step 602, and may designate one for use upon a game reset. This may be helpful, for example, when players wish to use different effects for later stages of a game, and in such a situation, step 615 results in the replacement of the player's first deck with the later one.

In step 616, the process may check to determine whether the game has ended. If the game has not ended, the process may return to step 605 (the steps in FIGS. 6a and 6b are pertinent to the home city and effects, but other game processes may occur as well, such as the actual running of the game, combat, etc., that are not depicted). If the game has ended (e.g., when a victory condition has been met by one of the players), the process may move to step 617, and experience points earned by a player in the current game may be tallied and added to the total experience points for each player's home city. If desired, a minimal condition may be placed on the awarding of such points. For example, losing players may be required to have survived for at least a predetermined amount of time (e.g., 2 minutes) before any points will be credited to their totals.

In step 618, the program may check to determine whether the home city's new experience point total has surpassed a new threshold for gaining a level and/or earning another effect. If the home city has passed such a threshold, the process may move to step 619, in which the player may select a new effect to add to his/her collection of obtained effects. The player may be presented with an onscreen display of the various effect trees (e.g., that shown in FIG. 5), and may be given the option of selecting one or more effects to be added to the player's collection. Then, in step 620, the game program may perform the same selection for the home cities of one or more computer-controlled players. In this manner, the computer-controlled players may "level up" and gain effects at the same rate as the human players, so that the computer-controlled players may continue to be worthy opponents for the human players. To this end, the game program may follow its own predetermined script or criteria when selecting effects and constructing decks. Alternatively, the game program may automatically generate new decks at the beginning of each game by averaging the home city experience level of the player(s) playing in the game, and selecting effects and decks based on that experience level.

After new effects are added (if any), the process may terminate, or it may start again with the next game session. In the next session, the new effects and experience point totals for the player's home city may persist from the earlier game, such that the home city continues to grow as the player plays more game sessions.

Figure 7:
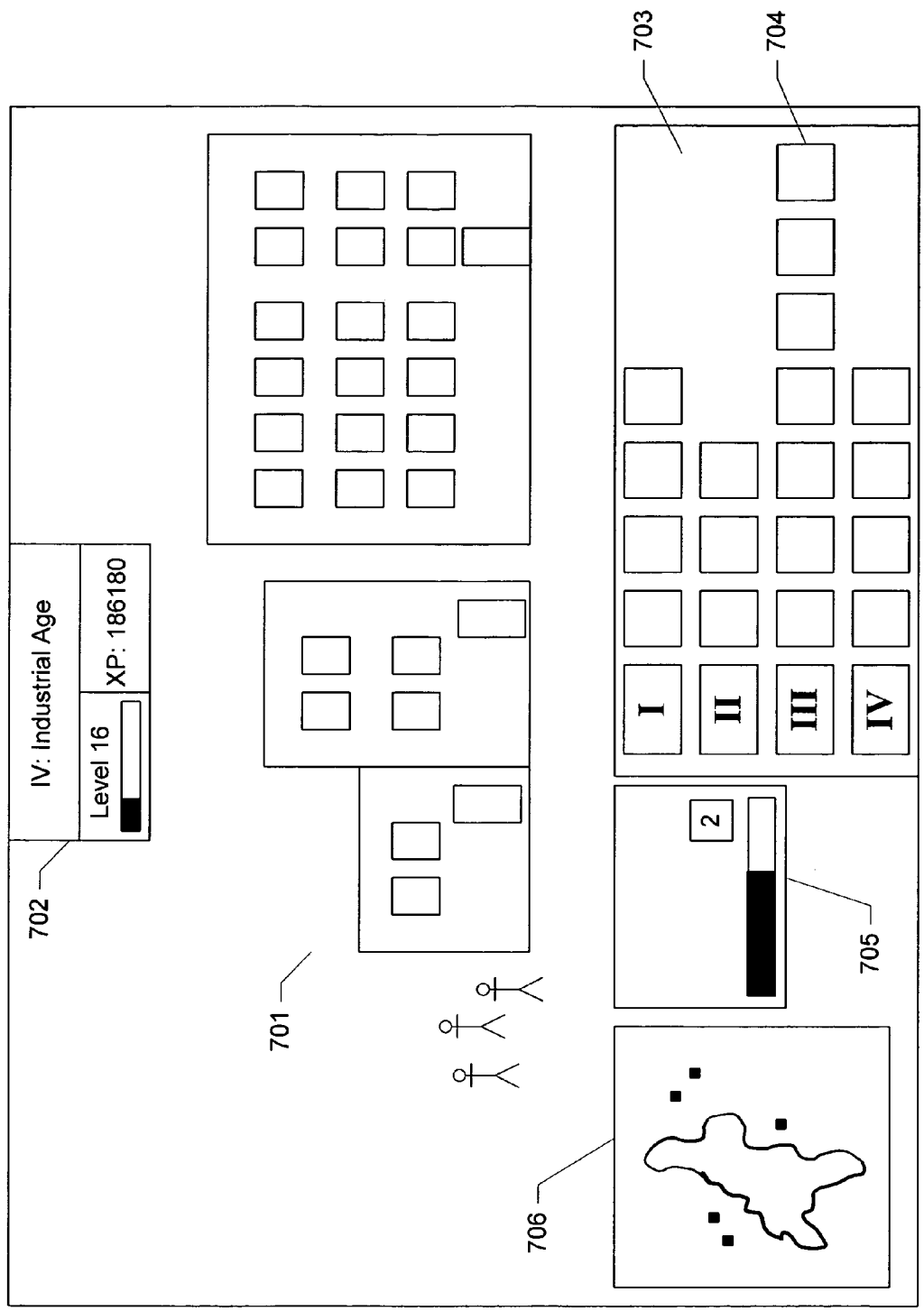
FIG. 7 illustrates an example screen for using a home city in an RTS game.

FIG. 7 illustrates an example of a home city screen that may be used by a player to interact with his/her home city during the course of a game session. The home city screen may primarily display a view 701 of the city itself, which may include a plurality of buildings and people. These elements are not necessarily interactive, and may simply be images and animations to depict a city. In some situations, the amount and/or type of buildings and people appearing in the home city view may vary according to the city's experience level. For example, as a city grows in experience, it may display more buildings and have more people. The player may be given the option of selecting the type(s) of additional structures and/or people to add when the city gains levels.

The home city view, which may be selected from within an ongoing game, may include an overall panel 702, showing the city's current level and experience point total. The panel 702 may include a bar graph, pie chart, or other graphic representation to indicate how close the city is to achieving the next level. The home city view may also include elements to show a player what effects from the player's deck are available for use in the current game. For example, the view may include a display 703 of the various effects 704 that are in the deck that the user has chosen for the current game. The listing may display effects that are currently available to the user, so, for example, if a limited-use effect has already been used, then that effect might not appear in the listing, or may appear with a different visual appearance (e.g., graying out, black/white, etc.) from other effects that are available to be used. The various effects may each be assigned a predetermined number of uses (e.g., some effects may be one-use only, some may have a different limit, and others may be of unlimited use).

Other limitations may also apply. For example, the player may be required to perform some action in the current game in order to gain access to an effect in his/her deck. One example may involve assigning level requirements to effects. Some games may include levels within the game, such as levels I to IV (which may correspond, for example, to different technological ages in the development of a civilization), and various effects in a player's deck may be unavailable until the player has reached the appropriate level in the current game (e.g., the player's in-game experience level). Advancing through in-game experience levels may include the same types of experience gaining described above with respect to home cities, and may alternatively include game-session-specific requirements. For example, attaining level II in a game may require the player to spend a predetermined amount of resources (e.g., 800 units of food and 1000 units of wood), and may require that the player have constructed certain predefined structures (e.g., a barracks, chapel, etc.) or created predefined units. The listing may display the available effects in a hierarchical order based on their required in-game experience level, such as that shown in FIG. 7.

The gaining of in-game levels may also bring in-game advantages beyond the ability to select certain effects in a player's deck. For example, certain types of structures, units, technologies, etc. may also have a required in-game level to use. Additionally, level bonuses may also be awarded to a player when they advance a level in the game. The level bonus may be the award of a number of predetermined units (e.g., 10 free infantry units, a special 'hero' unit, etc.), structures (e.g., 1 free barracks, granary, etc.), resources (e.g., 100 units of silver), or any other bonus that may provide an advantage to the player. In some games, a predetermined list of in-game level bonus types or categories may persist throughout the levels. For example, each player may start the game with a list of six bonus types, such as military, economic, resource, etc., and may select one with each in-game level achieved. When the user gains an in-game level and selects one type of bonus, it is no longer available the next time the player gains an in-game level. So, for example, if the player chooses to take the military advantage at the first gained in-game level, the military advantage is not offered the next time the player gains an in-game level. The remaining unselected types may be offered the next time the player gains an in-game level, and the bonuses may be adjusted to have a greater impact in the later levels (e.g., a level 1 "military" bonus may add 5 units, while a level 2 "military" bonus may add 10 units). The changes in level bonus may be identified in the game computer program or a user configuration setting, and may add more strategic decision making to the game.

The home city view may be requested in-game, and as a result, the view may include interface elements regarding the current game. For example, the display may include a progress panel 705 that displays the number of available effects the player has earned, the number of queued effects, and a progress indicator indicating how close the player is to earning another effect. The display may also include a reduced-size map 706 of the current game in progress, so the player can indicate locations for the delivery of effects, or to keep an overall view of happenings while managing the home city screen.

A number of alternatives and modifications to the above may also be implemented. For example, the level of a player's home city may have an in-game effect on the types of options, commands, and units available. For example, a sufficiently advanced home city may allow the player to begin the game with an ability to construct a certain type of advanced unit. Various units, technologies, structures, etc. may have a prerequisite home city level associated with them for this purpose.

As another alternative, the home city may appear on the map used for the game session. The various features described above may still apply, and the home city may still advance in levels and be used in a later game session.

As another option, the home city view may change to display different scenes depending on the player's interaction with the home city. For example, if the player is in the process of perusing his/her deck to select the next effect to request, and is viewing military effects, the display may change to show a corresponding scene.

The various home city aspects may persist outside of a game session. For example, the player's home city may be posted onto a network device, and other players may be permitted to view the home city. Players may buy and/or trade effects with one another, and may wager effects on the outcome of individual game sessions. Participants in a particular tournament may, for example, be given limited-edition effects bearing a logo or mark of the tournament.

Although the description above provides illustrative examples and sequences of actions, it should be understood that the various examples and sequences may be rearranged, divided, combined and subcombined as desired. For example, steps and features described may be omitted, or additional steps and features may be added. Accordingly, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim the following:

1. A strategy video game method, comprising:
   concluding a first game session of a real-time strategy game in response to a player achieving a victory condition in the first game session, the real-time strategy game stored in computer-readable storage media and executable by one or more processors;
   adding overall experience points to an overall experience of a home city of a player of the first game session based on achievements the player achieved during the first game session, wherein the home city is an off-map location that supports the player and provides resources and assistance to the player;
   determining that the overall experience of the home city exceeds a threshold level;
   delivering an effect or providing an assistance from the home city to the player when the overall experience of the home city exceeds the threshold level;
   persisting the overall experience of the home city to a second game session of the real-time strategy game for the player; and
   prior to starting the second game session:
   permitting a first selection of a first subset of available effects to construct a first deck associated with a first strategy corresponding to a first part of the second game session;
   permitting a second selection of a second subset of available effects to construct a second deck associated with a second strategy corresponding to a second part of the second game session that comes after the first part; and
   replacing the first deck with the second deck during the second game session when a predetermined in-game criterion is met.

2. The method of claim 1, wherein the home city is omitted from a map on which the first and second game sessions take place.

3. The method of claim 1, wherein the adding the overall experience points comprises adding the overall experience points to the overall experience based on achievements the player achieved while outside the home city.

4. The method of claim 1, wherein the delivering the effect or providing the assistance from the home city to the player comprises:
   prompting the player to select a new effect to add to a collection of effects owned by the player; and
   restricting the new effect from the user selection based on an experience level of the home city.

5. The method of claim 1, further comprising automatically advancing a home city level of the home city when the overall experience of the home city exceeds the threshold level.

6. The method of claim 1, wherein one of the effect or the assistance alters a victory condition.

7. The method of claim 1, wherein the delivering the effect or providing the assistance from the home city to the player includes delivering the effect or providing the assistance from an off-map location to an on-map location.

8. The method of claim 1, further comprising displaying a home city view of the home city, the home city view including the overall experience of the home city, a home city level achieved by the home city based on the overall experience, and a collection of effects owned by the player.

9. The method of claim 1, wherein the effect or the assistance expires after a single use.

10. The method of claim 1, wherein the predetermined in-game criterion is at least one of:
    a passage of a predetermined amount of time;
    a successful completion of the first part of the second game session;
    an acquisition of a certain technology within the second game session; or
    an accumulation of a predetermined amount of in-game experience points by the player.

11. The method of claim 1, further comprising posting the home city to a network device for viewing by other players.

12. One or more computer storage media, wherein the computer storage media are each selected from a group consisting of memory storage devices, system memory, volatile memory, nonvolatile memory, read only memory (ROM), random access memory (RAM), hard disk drives, nonvolatile magnetic media, magnetic disk drives, removable and nonvolatile magnetic disks, optical disk drives, removable and nonvolatile optical disks, CD ROMs, magnetic tape cassettes, flash memory cards, digital versatile disks, digital video tape, solid state RAM, and solid state ROM, the one or more computer storage media comprising computer-executable instructions that, when executed on one or more processors, causes the one or more processors to perform acts comprising:

storing a data structure for a player of a strategy game, the data structure identifying an experience level of a home city of the player, a number of home city effects available for delivery from the home city to the player during a playing of a session of the strategy game based on achievements the player achieved while outside the home city, and a plurality of decks of the home city effects assembled by the player, wherein the home city is an off-map location that supports the player and provides resources and assistance to the player; and prior to starting a game session:

selecting a first deck associated with a first player strategy corresponding to a first part of the game session;

selecting a second deck associated with a second player strategy corresponding to a second part of the game session that comes after the first part; and replacing the first deck with the second deck during the game session when a predetermined in-session criterion is satisfied.

13. The one or more computer storage media of claim 12, wherein the acts further comprise resetting the first or second deck during the game session.

14. The one or more computer storage media of claim 12, wherein the acts further comprise increasing the experience level upon completion of the game session, and using the new level when starting a new game after the completion.

15. A video game method, comprising:

awarding experience points to a home city in response to accomplishments of a player's character of the home city achieved in a strategy video game while the player's character is outside of the home city, wherein the home city is an off-map location that supports the player's character and provides resources and assistance to the player's character and the strategy video game is stored in computer-readable storage media and executable by one or more processors;

determining that an overall experience point total of the home city has surpassed a predetermined threshold;

rendering a set of previously-unavailable game effects available to the player for selection;

prompting the player to assemble, prior to starting a game session, a first deck of available effects and a second deck of available effects, wherein each of the first and second decks i) are limited to a predetermined number of available effects, and ii) correspond to different player strategies associated with different stages of the game session; and displaying a visual appearance of the home city in a home city screen, the visual appearance of the home city including a reduced-size map of the game session in progress.

16. The method of claim 15, further comprising posting the player's home city to a networked device, and allowing other players to view the player's home city.

17. The method of claim 15, further comprising carrying out a trade of effects between the player and a second player.

18. The method of claim 1, wherein at least one effect in the first or second subsets of available effects is an effect that interferes with a deck of an opposing player.

19. The one or more computer storage media of claim 12, wherein the predetermined in-session criterion is at least one of:

a passage of a predetermined amount of time;

a successful completion of the first part of the game session;

an acquisition of a certain technology within the game session; or an accumulation of a predetermined amount of in-game experience points by the player.

20. The method of claim 15, further comprising replacing the first deck with the second deck during the game session when a predetermined in-session criterion is satisfied, the predetermined in-session criterion being at least one of:

a passage of a predetermined amount of time;

a successful completion of at least one stage of the game session;

an acquisition of a certain technology within the game session; or an accumulation of a predetermined amount of in-game experience points by the player.

* * * * *